United States Patent
Brauneis et al.

(10) Patent No.: US 7,395,639 B2
(45) Date of Patent: Jul. 8, 2008

(54) DRIVE APPARATUS FOR A MAIL-PROCESSING SYSTEM

(75) Inventors: Axel Brauneis, Munzenberg Gambach (DE); Eddy Edel, Friedberg (DE)

(73) Assignee: Pitney Bowes Inc., Stamford, CT (US)

( * ) Notice: Subject to any disclaimer, the term of this patent is extended or adjusted under 35 U.S.C. 154(b) by 98 days.

(21) Appl. No.: 11/096,789

(22) Filed: Apr. 1, 2005

(65) Prior Publication Data

US 2006/0218877 A1 Oct. 5, 2006

(51) Int. Cl.
*B65B 61/20* (2006.01)
*B65B 43/26* (2006.01)

(52) U.S. Cl. .................................... 53/284.3; 53/569

(58) Field of Classification Search ............... 53/284.3, 53/569, 381.5–7, 252, 525
See application file for complete search history.

(56) References Cited

U.S. PATENT DOCUMENTS

| | | | | |
|---|---|---|---|---|
| 2,629,214 | A * | 2/1953 | McVey | 53/569 |
| 5,211,384 | A * | 5/1993 | Orsinger et al. | 270/59 |
| 5,284,004 | A * | 2/1994 | Metzler | 53/569 |
| 5,649,408 | A * | 7/1997 | Mazeiller | 53/460 |
| 5,651,238 | A * | 7/1997 | Belec et al. | 53/504 |
| 5,722,221 | A * | 3/1998 | Maltman et al. | 53/493 |
| 6,168,008 | B1 * | 1/2001 | Sting et al. | 198/461.3 |

FOREIGN PATENT DOCUMENTS

DE 19943759 C 9/1999

* cited by examiner

*Primary Examiner*—Rinaldi I. Rada
*Assistant Examiner*—John Paradiso
(74) *Attorney, Agent, or Firm*—Christopher H. Kirkman; Steven J. Shapiro; Angelo N. Chaclas

(57) ABSTRACT

A drive apparatus for a mail-processing system is specified, which apparatus has an enclosure-collating path, which is intermittently driven at least in one end section, an adjoining inserting station for sets of enclosures and an envelope-filling table, which extends parallel to the enclosure-collating path and in front of the inserting station and over which envelopes pulled from a stack of envelopes are pulled by means of an envelope-gripper chain in front of the inserting station and held open there and, once filled with the sets of enclosures, are conveyed away by the gripper chain. A reduction of mass moments of inertia of the drive for the envelope-gripper chain together with simplification of the structure of this drive and a conveying system of a modular design are achieved by a drive section as a chain drive or toothed-belt drive being guided downwards from an intermittently rotating drive shaft out of the region of the enclosure-collating path to a chain wheel or a belt pulley which is mounted in a substructure of the envelope-filling table. From there, a chain drive or toothed-belt drive leads in the substructure of the envelope-filling table to a chain wheel or a toothed-belt pulley which is mounted at the free end of a rocker, the free end of the rocker undergoing an approximately vertically oriented guidance in the substructure of the installation, while the upper end of the rocker is supported and mounted coaxially in relation to a drive shaft for the envelope-gripper chain on the envelope-filling table which is displaceable in relation to the substructure. A chain drive transmits the intermittent drive movement finally from the lower end of the rocker to the upper end of the rocker, onto the drive shaft which is coaxial to the rocker pivoting axis and is intended for the driving-chain wheel of the envelope-gripper chain.

7 Claims, 1 Drawing Sheet

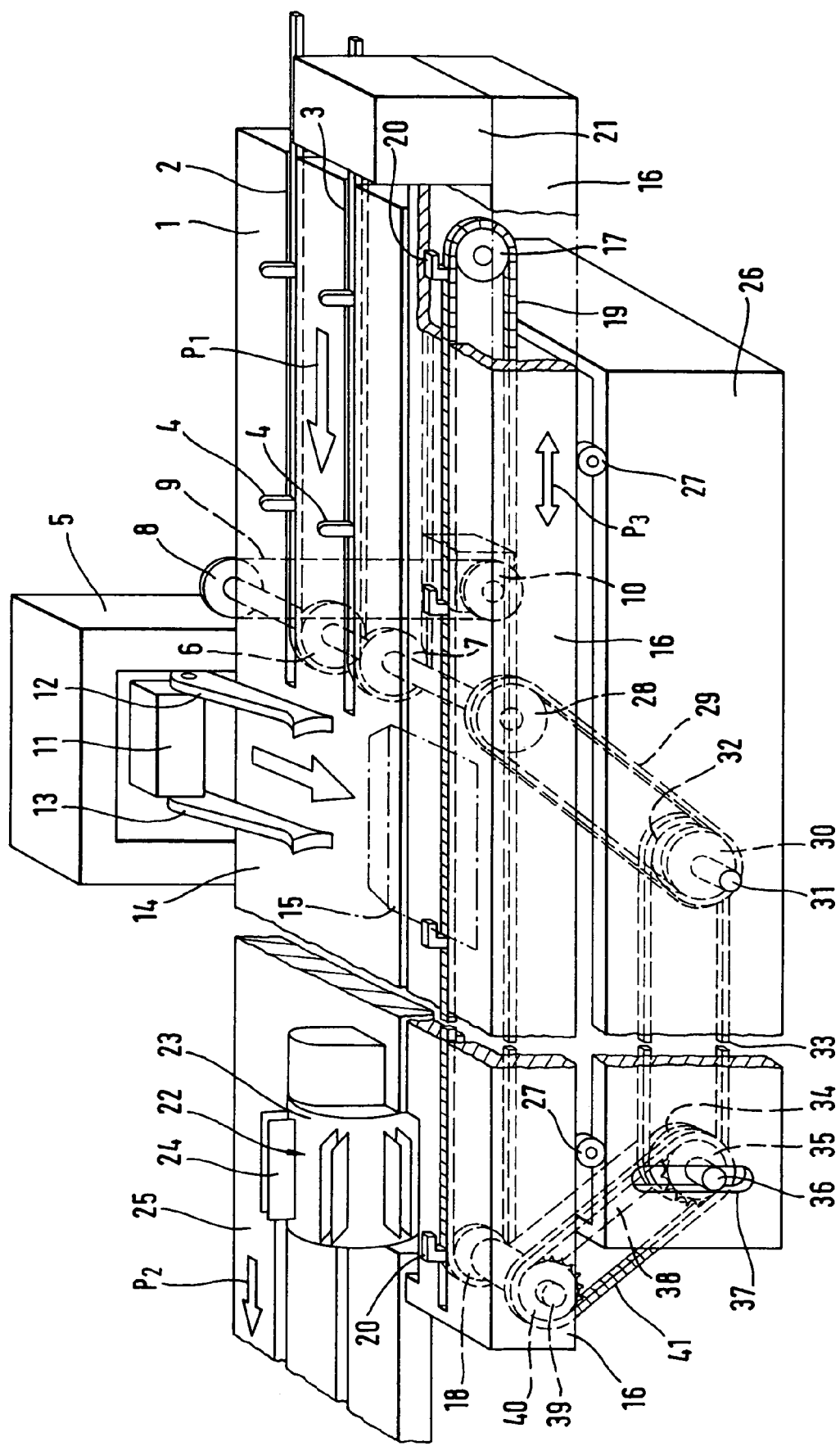

DRIVE APPARATUS FOR A MAIL-PROCESSING SYSTEM

BACKGROUND OF THE INVENTION

The invention relates to a drive apparatus for a mail-processing system which has an enclosure-collating path, which is intermittently driven at least in one end section and has conveying fingers arranged on endless, circulating conveying chains or conveying belts, and an inserting station, which follows the end of the enclosure-collating path, in the conveying direction of the latter, and by means of which sets of enclosures formed on the enclosure-collating path are inserted into envelopes, which are conveyed up on an envelope-filling table, parallel to the enclosure-collating path, by means of an envelope-gripper chain and are held open opposite the inserting station and, once filled with the sets of enclosures, are conveyed away from the inserting station by means of the envelope-gripper chain.

A drive apparatus of this type is disclosed by German patent 198 30 337. It contains a drive shaft which is driven by a stepping mechanism, revolves intermittently and extends transversely with respect to the conveying direction of the enclosure-collating path and on which chain wheels or rollers are fixed, over which the conveying chains or conveying belts of the intermittently driven section of the enclosure-collating path are positioned. This intermittently revolving drive shaft leads to a first bevel gear mechanism which is arranged in the region of the envelope-filling table and which, via a shaft extending along the envelope-filling table, is coupled to a further bevel gear mechanism, which ultimately serves for driving a chain wheel over which the envelope-gripper chain is positioned.

In the known apparatus, difficulties are presented in adjusting the positions of the gripper claws of the gripper chain, for example for adjusting to different envelope formats, before the inserting station or before an envelope turning station connected downstream in the direction of conveyance of the enclosure-collating path. The drive path from the stepping mechanism as far as the driven chain wheel of the envelope-gripper chain in the known drive apparatus has two bevel gear mechanisms, is massive and correspondingly sluggish, so that, on account of the acceleration and the retardation in the course of the intermittent activation, comparatively high torques occur, which cause increased wear. Finally, a modular design of the entire mail-processing system is made more difficult in the case of the known drive apparatus.

German patent 129 43 759 discloses an apparatus for feeding envelopes to an envelope-filling station, in which the envelope-filling table having an intermittently driven, circulating envelope-gripper chain can be displaced as a whole with respect to a substructure. The substructure contains a drive motor with an orientation of the drive shaft parallel to the conveying direction of the envelope-gripper chain and, coupled thereto via a reduction belt mechanism, an adjustable-length tapered shaft arrangement, which permits the envelope-filling table to be displaced relative to the substructure, the tapered shaft arrangement being coupled to a bevel gear mechanism in order ultimately to be able a drive a drive chain wheel of the envelope-gripper chain with an axis of rotation oriented transversely with respect to the conveying direction of the envelope-gripper chain.

Here, too, the result is a structure of the drive which is comparatively complicated and afflicted by sluggish masses and also the necessity to provide a drive motor separate from the usual drive means of the mail-processing system.

The invention is intended to achieve the object of configuring a drive apparatus for a mail-processing system in such a way that a simplification of the structure and a reduction in its susceptibility to wear is achieved by reducing the inertial masses. In particular, the structure of the drive apparatus is intended to simplify the adjustment of the position of the envelope-gripper chain along the enclosure-collating path.

SUMMARY OF THE INVENTION

In a preferred embodiment the invention includes:
a drive apparatus for a mail-processing system which has a driven enclosure-collating path and conveying fingers arranged on endless, circulating, conveying loops;
an inserting station, at a downstream end of the enclosure-collating path, by means of which sets of enclosures formed on the enclosure-collating path are inserted into envelopes.

Envelopes are conveyed on an envelope-filling table, parallel to the enclosure-collating path, by means of an envelope-gripper chain and are held open opposite the inserting station. Once filled with the sets of enclosures, the envelopes are conveyed away from the inserting station by means of the envelope-gripper chain, the conveying loops of the enclosure-collating path and the envelope-gripper chain each being driven by intermittently rotating drive shafts. An intermittently rotating drive shaft is coupled to the drive for the enclosure-collating path, and bears a first pulley of a first drive loop. The loop is guided downwards from the level of the enclosure-collating path and serves for driving a second pulley which is mounted in a substructure of the envelope-filling table, around which is positioned a second drive loop. The second drive loop is guided essentially horizontally in the substructure to a corresponding third pulley, which is supported and guided in a region of the substructure in a vicinity of an end of the envelope-gripper chain, and from which a third loop leads to a fourth pulley which serves for driving a envelope-gripper chain. The said driving-chain wheel is mounted on the envelope-filling table, in the vicinity of the end thereof.

In a further embodiment the envelope-filling table can be displaced relative to the substructure parallel to the conveying direction of the enclosure-collating path, and can be adjusted to certain displacement positions by means of a positioning drive. Also, the fourth pulley is coupled to the driving chain wheel by a rocker mechanism whereby, the driving chain wheel can be displaced with the envelope filling table parallel to the conveying direction.

DESCRIPTION OF THE DRAWINGS

FIG. 1. depicts an embodiment of a drive mechanism for a mail processing system.

DESCRIPTION

In the following text, an exemplary embodiment of the drive apparatus specified here will be explained in detail with reference to the appended drawing, in the single drawing figure of which a schematic perspective illustration of part of a mail-processing system having an envelope-filling table and an associated drive apparatus is shown.

In the following text, an exemplary embodiment of the drive apparatus specified here will be explained in detail with reference to the appended drawing, in the single drawing FIGURE of which a schematic perspective illustration of part of a mail-processing system having an envelope-filling table and an associated drive apparatus is shown.

The mail-processing system according to FIG. 1 contains an enclosure-collating path 1 which has endlessly circulating conveying chains or conveying belts 2 and 3 which, at the start and at the end of the circulation, are positioned over chain wheels or rollers and which are fitted with conveying fingers 4 which, in the region of the upper runs of the conveying chains or conveying belts 2 and 3, project above the level of the surface of the enclosure-collating path and in each case define enclosure compartments in pairs. Enclosures can be positioned in the enclosure compartments by means of discharge devices, not illustrated in the drawing, which are lined up along the enclosure-collating path, so that ultimately sets of enclosures are assembled in the enclosure compartments.

If the discharge devices are devices which are able to position enclosures in moving enclosure conveying compartments, then a section of the enclosure-collating path can be equipped with continuously driven conveying chains or conveying belts, from the conveying compartments of which the conveying fingers of an intermittently driven end section of the enclosure-collating path take over the sets of enclosures at a conveying speed which is cyclically higher and convey them onwards in the direction of an inserting station 5. In the drawing, the intermittently driven end section of an enclosure-collating path is illustrated. The conveying chains or conveying belts 2 and 3 are positioned around driven chain wheels or rollers 6 and 7, respectively, at the front end of the enclosure-collating path 1, corresponding to the arrow $P_1$ in the conveying direction, the said chain wheels or rollers 6 and 7 being fixed to an intermittently revolving drive shaft 8. The intermittently revolving drive shaft 8 is coupled via a toothed belt 9 to a stepping mechanism 10, which is in turn driven by a drive motor, not shown in the drawing. The intermittently revolving drive shaft 8 is led through underneath the enclosure-collating path 1 in the manner indicated in the drawing and is mounted in the frame structure of the mail-processing system.

In the inserting station 5, a set of insertion fingers 12 and 13 is attached to a support 11 of an insertion device, which support can be moved to and fro transversely with respect to the conveying direction of the enclosure-collating path 1, the lower ends of the said insertion fingers 12 and 13 being guided in a manner known per se over a base plate 14 of the inserting station so as to slide over the latter and, in a reverse stroke over the base plate 14, being guided and lifted into the initial position. In the working stroke, the insertion fingers 12 and 13 push a set of enclosures conveyed on the base plate 14 by the conveying fingers 4 of the enclosure-collating path 1 into envelopes 15 provided open opposite the inserting station.

The envelopes 15 are transported over an envelope-filling table 16 by means of an endless envelope-gripper chain 19 positioned over chain wheels 17 and 18 and fitted with gripper claws 20. The gripper claws 20 project beyond the upper side of the envelope-filling table 16 in the region of the upper run of the envelope-gripper chain 19 and can be closed and opened in specific gripper chain positions in a manner familiar to those skilled in the art, in such a way that, at the start of the envelope-gripper chain 19, opened envelopes from an envelope magazine 21 can be pushed into an opened gripper claw 20, then gripped by the relevant gripper claw and transported over the envelope-filling table 16 in parallel with the enclosure-collating path 1 in front of the inserting station 5, released briefly here by the gripper claw 20 by opening the same, in order that insertion of a set of enclosures can be carried out by the inserting station 5, after which the filled envelope is gripped again by the gripper claw 20 and, as a result of renewed drive of the envelope-gripper chain 19, is guided through an envelope-closing section (not shown in the drawing) and finally reaches an envelope-turning station 22, where the gripper claw 20 deposits the envelope between tongs 24 provided axially on the circumference of a turning cylinder 23 of the envelope-turning station 22. The turning cylinder 23 of the envelope-turning station 22 is then set rotating intermittently and the filled envelope, which has previously been deposited between the parts of the tongs 24 located approximately at the level of the upper side of the envelope-filling table 16, is carried over the circumference of the turning cylinder 23, turned through 180°, is deposited on an output conveyor path 25 and then conveyed away in the direction of the arrow $P_2$ with the envelope window side or address side pointing upwards.

The entire envelope-filling table 16 can be displaced to and fro with respect to the envelope-collating path 1, the inserting station 5 and the envelope-turning station 22 on a substructure 26, as indicated symbolically by rollers 27 between the substructure 26 and the envelope-filling table 16, by means of suitable drive means, not shown in the drawing, by a distance which corresponds to the range of possible format differences of the envelopes 15 processed on the mail-processing system. By means of longitudinal displacement of the envelope-filling table 16 in both directions in accordance with the arrow $P_3$ together with the envelope-gripper chain 19 and the envelope magazine 21, adjustment of the position of the envelopes to be filled 15 before the inserting station and adjustment of the position of the filled envelope relative to the tongs 24 of the envelope-turning station 22 is carried out, depending on the envelope format, without this adjustment having to be performed by means of complicated control of the drive of the envelope-gripper chain and the actuating means for opening and closing the gripper claws 20.

The drive of the envelope-gripper chain 19 is carried out by the intermittently revolving drive shaft 8 in the manner described in detail in the following text.

As already mentioned above, the intermittently revolving drive shaft 8 is mounted in a fixed position with respect to the enclosure-collating path 1 and the inserting station 5 and also with respect to the substructure 26. The drive shaft 8 is led through between the upper run and the lower run of the envelope-gripper chain 19 and, at its end close to the observer facing the drawing FIGURE, bears a toothed-belt pulley 28. The end of the drive shaft 8 reaching into the interior of the envelope-filling table 16 and the toothed-belt pulley 28 have no connection to the envelope-filling table 16. From the toothed-belt pulley 28, a toothed belt 29 leads to a further toothed-belt pulley 30, which is seated on a shaft 31 mounted in the substructure 26. The shaft 31 drives a further toothed-belt pulley 32 which is seated beside the toothed-belt pulley 30 and from which an endless toothed belt 33 is guided within the substructure 26, approximately horizontally, to the one toothed-belt pulley 34. This toothed-belt pulley is seated with a chain wheel 35 on a common shaft 36, which is not fixedly mounted within the substructure 26 but is guided in slotted guides of the substructure 26, approximately vertically and preferably in an arc concentric with the shaft or axle 31, the slotted guide of the substructure 26 facing the observer being designated 37 in the drawing.

The toothed-belt pulley 34 and the chain wheel 35 are supported by the shaft 36, which can also be constructed as an axle, via a rocker 38 which, at its lower, free end, bears the bearing point for the shaft 36 or the fixing point for an axle 36 and is in turn pivotably mounted on a shaft 39 supported and mounted on the envelope-filling table 16. The shaft 39 serves to drive the front chain wheel 18 around which the envelope-gripper chain 19 is positioned. For this purpose, an endless circulating drive chain 41 is positioned around the chain wheel 35 seated on the shaft or axle 36 and a chain wheel 40 fixed to the drive shaft 39, its effective length being determined by the unchanging length of the rocker 38. Of course, suitable adjusting means for adjusting or changing the tension of the drive chain 41 can be provided, but have been left out of the drawing in order to simplify the illustration.

It is possible to see that, from the intermittently revolving drive shaft 8, which receives its drive force from the stepping mechanism 10 via the toothed-belt drive 9, the drive force is transmitted intermittently via the toothed-belt pulleys 28 and 30 and the toothed belt 29 positioned over the latter, furthermore via the drive shaft 31, which is mounted fixedly in the substructure 26, from there via the toothed-belt pulleys 32 and 34 and the toothed belt 33 positioned over the latter to the chain wheel 35 and from there, finally, via the drive chain 44 to the chain wheel 40, the shaft or axle 36 not being supported fixedly in the substructure 26 or mounted in the substructure 26 but merely being guided in the guide slots 37, while a fixed mounting is provided for the drive shaft 39 in the envelope-filling table 16 which, within the limits specified above, can be displaced horizontally in the direction of the arrow $P_3$ relative to the substructure 26 and also to the enclosure-collating path 1 and the envelope-filling station 5 and also the envelope-turning station 22.

This displacement by suitable drive means is possible without any adjustment of the drive connections between the intermittently revolving drive shaft 8 and the gripper-chain drive shaft 39. If the envelope-filling table 16 moves to the left relative to the substructure 26 and the enclosure-collating path 1 during a process of setting the system to a specific format of an envelope 15 to be processed, this has the effect that the rocker 38 is pivoted in the anticlockwise direction about the geometric axis of the drive shaft 39 of the envelope-gripper chain 19 in relation to the illustration in the drawing FIGURE, and the axle or shaft 36 is displaced upwards in the guide slots 37, the effective axle spacings between the shaft (or axle) 31 mounted in the substructure 26 and the shaft or axle 36 merely guided in the substructure 26 and the drive shaft 39 mounted in the envelope-filling table 16 remaining unchangeable.

The course of the drive sections of the intermittently revolving drive shaft 8 which, in relation to the conveying direction corresponding to the arrow $P_1$ of the enclosure-collating path 1, is located somewhat close to the start of the inserting station 5, downwards to a lower level of the substructure 26 and from there forwards as far as the region of the substructure 26 provided with the slotted guides 37 and then upwards to the region of the end of the envelope-gripper chain 19 makes it possible for the spaces immediately underneath the envelope-gripper chain 19 to remain free for actuating elements for their grippers 20 and for drives of auxiliary devices which comprise suction cup arrangements, not shown in the drawing, for holding open the envelope 15 to be filled in front of the insertion device 5, parts of the envelope-flap closing device and the like.

In the embodiment shown in the drawing of a drive apparatus of the type specified in the present case, the intermittently revolving drive shaft 8 is directly also the drive shaft for the intermittently driven chain wheels 6 and 7 of the conveying chains 2 and 3 of the enclosure-collating path 1.

According to a modified embodiment, however, a drive shaft parallel to the intermittently revolving drive shaft 8 and mounted and supported close to the latter in the frame structure of the enclosure-collating path 1 can also be provided, which is likewise driven by the stepping mechanism 10 and in turn serves to drive the toothed-belt pulley 28.

The drive apparatus shown and described has the advantage by comparison with corresponding known designs that it has a low number of deflections of the orientation of the axes of rotation of its drive units and is affected by low inertial torques with respect to the acceleration phases and stopping phases caused by the intermittent drive. A displacement of the envelope-filling table relative to the enclosure-collating path can be carried out particularly simply.

Because of the reduction in the effective reaction torques, the design permits wear to be reduced. Because of the subdivision of the drive sections between the drive of the enclosure-collating path and the envelope-gripper chain, the possibilities of a modular design are expanded.

What is claimed is:

1. Drive apparatus for a mail-processing system, comprising:
    a driven enclosure-collating path having conveying fingers arranged on endless, circulating conveying loops; and
    an inserting station at a downstream end of the enclosure-collating path, and by means of which sets of enclosures formed on the enclosure-collating path are inserted into envelopes, which are conveyed on an envelope-filling table, parallel to the enclosure-collating path, by means of an envelope-gripper chain and are held open opposite the inserting station and, once filled with the sets of enclosures, are conveyed away from the inserting station by means of the envelope-gripper chain, the drive apparatus comprising:
    an intermittently rotating drive shaft driving the conveying loops of the enclosure-collating path and the envelope-gripper chain, wherein the drive shaft is coupled to a drive for the enclosure-collating path and bears a first pulley of a first drive loop, which is guided downwards from a level of the enclosure-collating path and drives a second pulley, which is mounted in a substructure of the envelope-filling table and around which is positioned a second drive loop, which is guided essentially horizontally in the substructure to a corresponding third pulley, which is supported and guided in a region of the substructure in a vicinity of an end of the envelope-gripper chain, and from which a third loop leads to a fourth pulley, which drives the envelope-gripper chain by a driving chain wheel, said fourth pulley and said driving chain wheel being mounted on a shaft on the envelope-filling table, in the vicinity of the end thereof.

2. The drive apparatus of claim 1, wherein the envelope-filling table is movable relative to the substructure parallel to a conveying direction of the enclosure-collating path.

3. The drive apparatus of claim 2, further comprising a rocker mechanism coupling the third pulley to the shaft, the rocker mechanism pivoting to allow the shaft to move with the envelope-filling table relative to the substructure.

4. The drive apparatus of claim 2, wherein the third pulley is associated with a third shaft that is movably disposed in a slot on the substructure.

5. The drive apparatus of claim 1, wherein the envelope-gripper chain extends in its conveying direction past the inserting station, beyond an envelope-flap-closing section, into an envelope-turning station.

6. The drive apparatus of claim 1, wherein the loops comprise chains or belts.

7. The drive apparatus of claim 6, wherein the pulleys comprise chain wheels or toothed belts.

* * * * *